United States Patent Office 3,001,884
Patented Sept. 26, 1961

3,001,884
MIXTURES OF CELLULOSE ETHERS AND STARCH ETHERS
Gerard J. J. Nijhoff, Nijmegen, Netherlands, assignor to Kunstzijdespinnerij Nyma N.V., Nijmegen, Netherlands, a limited liability company of the Netherlands
No Drawing. Filed Nov. 12, 1958, Ser. No. 773,145
4 Claims. (Cl. 106—188)

The present invention relates to the manufacture of mixtures of cellulose and starch ethers and especially to mixtures of carboxyalkyl cellulose and carboxyalkyl starch.

It is known to prepare a dispersion of starch or a solution of a cellulose ether in water for the purpose of sizing textile yarns.

The use of starch in sizing compositions has the drawback that before application the dispersion needs cooking during a considerable time to gelatinize the starch. Moreover the required enzyme desizing of the fabrics after weaving is costly and time-consuming, while the desizing wastes cause stream pollution. In spite of these drawbacks starch is widely used, primarily because of the cheapness of this substance.

On the contrary cellulose ethers have the advantage of solubility in cold water, but they are more expensive than starch. The same is true for starch ethers. Besides, often great difficulties are encountered in the manufacture of starch ethers. When the starch particles react with the etherifying reagent in an alkaline medium—as usual in the manufacture of cellulose ethers—the particles swell in this medium, lumps of starch and alkali are formed and finally an elastic rubber like and unmanageable mass which is not suitable for further reaction is obtained.

It is the object of the present invention to provide a method of manufacture of a mixture of a starch and a cellulose ether which combines the advantages of solubility in cold water and of economy.

It is another object of the present invention to prepare sizing compositions by dissolving the said mixture in water.

It is a further object of the present invention to size textile yarns with the said sizing compositions.

Other objects of the invention will appear hereinafter.

The objects of the present invention may be accomplished in general by reacting alkali cellulose and starch with an etherifying reagent in one reaction mixture. Thus a valuable new composition of matter is obtained, especially suitable for sizing purposes.

Preferably the starch is added to a reaction mixture of alkali cellulose and etherifying reagent, in which the alkali cellulose is already partly reacted with the etherifying reagent; consequently the quantity of alkali in the reaction mixture is decreased and the objectionable forming of lumps of alkali and starch is fully avoided.

It is also possible to add starch and an additional amount of etherifying agent shortly one after another or to add starch mixed with an additional amount of etherifying agent. The etherifying reagent already present and the additional etherifying agent may be different. Also an additional amount of alkali may be added together with the starch or with the additional etherifying agent or as a first or final addition when the etherifying of the starch starts.

Often it is desired to obtain a pure mixture. Then it is preferred to purify the reaction mixture by extracting the same with an acidified mixture of water and an organic solvent miscible with water, for example, an acidified water-ethanol mixture containing 70% by volume of ethanol. In this known purifying process for cellulose ethers the acid neutralizes the excess of alkali in the reaction mixture, the salts formed during the reaction and the neutralization dissolve, and the pure ether mixture is obtained.

When technical grade ether mixture is desired, such a purifying is not necessary and only the excess of alkali in the reaction mixture is neutralized with known means such as $NaHCO_3$, acetic acid, hydrochloric acid and phosphoric acid.

The details and the best manner of practising the invention will be apparent by reference to the following specific examples, it being understood that these examples refer merely to illustrative embodiments of the invention and that the scope of the invention is not limited thereto.

Example I

Cellulose from wood was converted to alkali cellulose by steeping in a solution of NaOH (18% by weight). After pressing and shredding alkali cellulose crumbs were obtained containing 30.5% of cellulose and 15.0% of NaOH. 312 g. of these crumbs were mixed with 122 g. sodiummonochloroacetate (sodium chloracetate) and the resulting mass was ground during 1 hour at a temperature of 25° C. Agitation was continued for 2 hours, during which time the reaction mass was kept at 40° C. A portion of the anhydroglucose units of the cellulose reacted according to

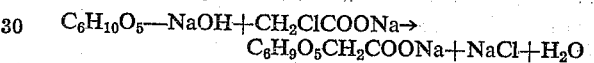

in which reaction the alkali of the alkali cellulose was consumed.

The amount of sodiumhydroxide in the reaction mixture, being decreased in this manner, 200 g. starch was added and the mass was further agitated for an additional 5½ hours at a temperature of 40° C. During this time the starch was also etherified according to the above mentioned reaction equation.

The reaction mass was finally extracted with acidified aqueous ethanol (70% by volume) to remove the excess of NaOH together with the NaCl formed and the sodiumglycolate originating from the side reaction

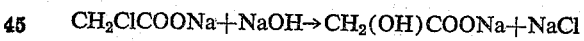

The obtained purified ether mixture showed the following analysis figures, in which the degree of substitution refers to the average number of carboxymethyl groups present per anhydroglucose unit.

Degree of substitution: 0.45
Viscosity of a solution of 1% by weight in water at 20° C.: 112 centipoises.
Combined ether content: 86.4%
Moisture content: 11.8%

Example II 250 g. of alkali cellulose from wood pulp prepared according to Example I was ground with 75 g. of $CH_2ClCOONa$ during one hour at a temperature of 22° C. Agitating was continued for 2 hours at 35° C. Thereupon 174 g. starch and an additional quantity of 23 g. $CH_2ClCOONa$ were added. This mixture was agitated for 7 hours at a temperature of 35° C. Finally the reaction mass was extracted with acidified aqueous ethanol of 70% by volume. The obtained mixture of ethers showed the following analysis figures:

Degree of substitution: 0.37
Viscosity of a solution of 1% by weight in water at 20° C.: 95 centipoises.
Combined ether content: 89.2%.
Moisture content: 9.4%.

Example III 400 g. of alkali cellulose from wood pulp prepared according to Example I were ground with 113 g. of $CH_2ClCOONa$ at 24° C. Agitating was continued for 4 hours at 33° C. Thereupon 370 g. of starch and an additional quantity of 36 g. of $CH_2ClCOONa$ were added. This mixture was agitated for 5 hours at a temperature of 33° C. Finally the reaction mass was extracted with acidified aqueous ethanol of 70% by volume.

The obtained mixture of ethers showed the following analysis figures:

Degree of substitution: 0.25
Viscosity of a solution of 1% by weight in water at 20° C.: 52 centipoises
Combined ether content: 90.9%
Moisture content: 8.4%

Example IV

To 203 kg. of shredded alkali cellulose from wood pulp containing 31.0% of cellulose and 15.1% of NaOH, which had been ripened during 16 hours at 28° C., 58.5 kg. of $CH_2ClCOONa$ were added. This mixture was ground during 1 hour at a temperature of about 23° C. Agitating was continued for 4 hours at 30° C. Thereupon 143.6 kg. of starch and an additional amount of 14.1 kg. of $CH_2ClCOONa$ were added. The reaction mass was agitated a further 5 hours at 30° C. Finally the reaction mass was extracted with acidified aqueous ethanol of 73% by volume, containing the necessary amount of HCl to neutralize the mixture.

The product obtained showed the following analysis figures:

Degree of substitution: 0.31
Viscosity of a solution of 1% by weight in water at 20° C.: 33 centipoises
Combined ether content: 87.7% by weight
Moisture content: 5.7% by weight

Example V

To 137 kg. of shredded alkali celluose from wood pulp containing 31.8% of cellulose and 15.4% of NaOH, which had been ripened during 16 hours at 28° C., 39.5 kg. of $CH_2ClCOONa$ were added. This mixture was ground during 1 hour at a temperature of about 24° C. Agitating was continued for 4 hours at 33° C. Thereupon 97 kg. of starch and an additional amount of 9.5 kg. of $CH_2ClCOONa$ were added. The reaction mass was agitated a further 5 hours at 33° C. Finally the reaction mass was purified in the same manner as indicated in Example IV.

The product showed the following analysis figures:

Degree of substitution: 0.29
Viscosity of 1% solution in water at 20° C.: 26 centipoises
Combined ether content: 85.3%
Moisture content: 6.9%

Example VI

Cotton linters cellulose was converted to alkali cellulose by steeping in a solution of NaOH (18% by weight). Aftere pressing and shredding alkali cellulose crumbs were obtained containing 30.5% of cellulose and 15.6% of NaOH. 500 g. of these crumbs were mixed with 139 g. of $CH_2ClCOONa$ and the resulting mass was ground during 1 hour at 22° C. Agitation was continued for 4 hours at 36° C. Thereupon 823 g. of starch and 10 minutes thereafter an additional quantity of 85.5 g. of $CH_2ClCOONa$ were added. This mixture was agitated for 5 hours at 36° C. Finally the reaction mass was purified in the same manner as indicated in Example IV.

The product showed the following analysis figures:

Degree of substitution: 0.16
Viscosity of a 1% solution in water at 20° C.: 105 centipoises
Combined ether content: 88.6%
Moisture content: 11.1%

Example VII 35.5 g. of shredded wood pulp was suspended in 850 g. of 87% isopropanol. The resulting slurry was agitated and 100 g. of an aqueous solution of NaOH of 40% by weight was added over a period of 30 minutes. Thereupon 32.2 g. of monochloroacetic acid (chloracetic acid) was added over a period of half an hour. The temperature rose from 20° C. to 25° C. during this time. The reaction mixture was heated to 55° C. and kept at this temperature for 1½ hours. 71 g. of starch and then 14.2 g. of $CH_2ClCOOH$ were added. The resulting mixture was agitated for 2½ hours at 55° C. Finally the solid reaction mass was separated from the liquid and purified in the same manner as indicated in Example IV.

The product showed the following analysis figures:

Degree of substitution: 0.35
Viscosity of a 1% solution in water at 20° C.: 34 centipoises
Combined ether content: 89.0%
Moisture content: 9.5%

Example VIII

The process according to Example VII was repeated but in stead of 850 g. of 87% isopropanol 740 g. pure n-propanol and in stead of 100 g. of NaOH of 40% by weight 210 g. of NaOH of 19% by weight were added.

The following results were obtained:

Degree of substitution: 0.33
Viscosity of a 1% solution in water at 20° C.: 23.6 centipoises
Combined ether content: 82.9%
Moisture content: 14.0%

The following 3 examples relate to technical grade products.

Example IX

A crude reaction mass was prepared according to Example II. However in this case the mass was neutralized with sodium bicarbonate, dried and ground.

This technical grade product showed the following analysis:

Degree of substitution: 0.37
Viscosity of a 2% aqueous solution at 20° C.: 66 centipoises
Combined ether content: 60.2%
Moisture content: 15.6%
Total salts content: 24.2%
$(NaCl+CH_2OHCOONa+NaHCO_3+Na_2CO_3)$

Example X

To 520 g. of shredded alkali cellulose from wood pulp containing 30.3% of cellulose and 15.5% of NaOH, which had been ripened during 24 hours at 27° C., 186 g. of $CH_2ClCOONa$ were added. The mixture was ground during 1 hour at a temperature of 27.5%. Agitating was continued for 4 hours at 36.5° C. Thereupon 358 g. of starch and an additional amount of 35 g. of $CH_2ClCOONa$ were added. The reaction mass was agitated a further 5 hours at 36.5° C. Thereafter 10 g. of sodium bicarbonate was added to neutralize the excess of NaOH in the reaction mass.

The preparation of a technical grade product was finished by drying and grinding the neutralized reaction mass.

Analysis of this product:

Degree of substitution: 0.32
Viscosity of a 2% aqueous solution at 20° C.: 40 centipoises Combined ether content: 66.5%
Moisture content: 6.6%
Total salts content: 26.9%

Example XI

To 400 g. of shredded alkali cellulose from wood pulp containing 31.8% of cellulose and 15.7% of NaOH, 159 g. of $CH_2ClCOONa$ were added and the resulting mass was ground 1 hour at 29° C. Agitating was continued for 2 hours at 38° C. Thereupon 366 g. of starch was added. The reaction mass was agitated a further 7 hours at 34° C. Thereafter 105 g. of acetic acid was added to neutralize the excess of NaOH in the reaction mass.

The preparation of a technical grade product was finished by drying and grinding the neutralized reaction mass.

Analysis of this product:

Degree of substitution: 0.26
Viscosity of a 2% aqueous solution at 20° C.: 36 centipoises
Combined ether content: 68.3%
Moisture content: 8.6%
Total salts content: 23.1%
($NaCl+CH_2OHCOONa+CH_3COONa$)

In the method for the preparing of mixtures of cellulose and starch ethers according to the foregoing example no difficulty was encountered due to formation of lumps of starch and alkali.

The mixtures obtained according to the foregoing examples are especially useful as sizing compositions as will be set forth hereinafter. Further the invented mixtures showed to be useful for many purposes for which the use of cellulose ethers alone is already known, for example in drilling muds, in detergents, for the finishing of textile fabrics, as a thickening agent in printing pastes for the printing of textiles, for the manufacture of paper and further as a thickening, filmforming, dispersing agent for example in foods, cosmetics, paints and pharmaceuticals.

In the examples above wood cellulose and cotton cellulose were used, but also less purified cellulose is suitable for technical grade products.

In the examples potato starch was used. Of course the invention is also applicable to starches of other origin, for example rice, wheat, and corn, and to starch fractions such as amylose and amylopectine.

The quantity of the added etherifying reagent may be varied within wide limits to obtain the desired degree of substitution to fit the application. As it is the object of the invention to obtain a mixture which is soluble in water and as cellulose needs in general a minimum degree of substitution of 0.3 and starch a minimum degree of substitution of about 0.05 to obtain this solubility in water, the respective degrees of substitution of the compounds of the mixture of the invention are preferably above the said minimum limits. Since mixtures containing considerable more starch ether than cellulose ether are within the scope of this invention, the minimum limit of 0.05 is also valid for the degree of substitution for the ether mixture.

It is possible to attain degrees of substitution as high as about 1.5 for the combined ether. However, because of economical reasons the degree of substitution is preferable held between the above mentioned minimum limit and about 1.

The invention is not limited to the use of water soluble monochloroacetates and monochloroacetic acid but comprises also the use of corresponding compounds derived from other carboxylic acids and further alkylene oxides and hydroxyalkylchlorides for example water soluble monochloro propionates and monochloro butyrates, monochloro propionic acid and monochloro butyric acid; the latter compounds in which chlorine is replaced by bromine or iodine; ethylene oxide and propylene oxide; 2-halo 1-hydroxy ethane, in which the halogen is chlorine, bromine or iodine. In other words, the invention comprises mixtures of carboxyalkyl ethers, hydroxyalkyl ethers and carboxyalkyl-hydroxyalkyl ethers of starch and cellulose. The latter are obtained by employing a mixture of etherifying reagents in the etherifying reaction. As mentioned above a different etherifying reagent may be used for the cellulose and the starch. Mixtures substantially consisting of carboxyalkyl cellulose and hydroxyalkyl starch and mixtures substantially consisting of hydroxyalkyl cellulose and carboxyalkyl starch are within the scope of this invention.

The ratio of the quantities of the cellulose ether and the starch ether in the mixture may be varied between wide limits. Because of economical reasons the use of the mixture is attractive when at least 10% of the starch ether is present in the mixture.

As the starch requires only very small amounts of alkali and of etherifying reagent to obtain the necessary etherification for a sufficient solubility, it is obvious that even mixtures consisting of 20 parts of starch ether and 1 part of cellulose ether may be manufactured according to the process of the invention.

As is shown by the foregoing examples the process of the invention is applied to known processes for the manufacture of cellulose ethers alone. The Examples I–VI, IX, X and XI relates to a non-slurry method, the Examples VII and VIII to a slurry method in which the reacting agents are suspended in an organic solvent miscible with water.

The following examples will serve to illustrate the usefulness of the invented mixture for sizing purposes.

Example XII

A mixture of a cellulose ether and a starch ether, manufactured and purified according to Example IV, was dissolved in water (3.5 parts of the mixture and 96.5 parts of water).

A cotton warp yarn (count 24) was sized with this solution at a temperature of 92° C., by which the yarn gained 3.4% of the original weight. The sized yarn had a tensile strength of 374 g., while the strength of the non-sized yarn was 291 g. The elongation of the sized yarn was 4.0%, of the non-sized yarn 5.6%.

To compare the results of the mixture of the invention with the sizing results of sodium carboxymethyl cellulose (C.M.C.) alone the same yarn was sized with a C.M.C. solution of 3.5% by weight. This C.M.C. showed the following analysis figures:

Degree of substitution: 0.6
Viscosity of a solution of 1% in water: 47 centipoises
Ether content: 89.3%
Moisture content: 10.2%

The sized yarn had a tensile strength of 360 g. and an elongation of 3.8%.

The above mentioned experiments show the very satisfactory behaviour of the mixture of the invention. The tensile strength obtained with the sizing composition of the invention is higher than that of the yarn sized with C.M.C. alone.

Example XIII

A mixture of a cellulose ether and a starch ether manufactured and purified according to Example I was dissolved in water. A film was prepared from this solution by pouring the solution on a plate of glass. After evaporation of the liquid, the film was removed and conditioned at 20° C. and 60% R.H. The tensile strength was found to be 500 kg./cm.$^2$, the elongation 10%.

The tensile strength of a similar C.M.C. film was 700 kg./cm.$^2$, the elongation 11%.

Keeping in mind that starch has negligible film-forming properties—the preparation of a starch film in the described manner is not possible at all because of the brittleness of this material—it is surprising that a film containing a substantial amount of starch ether with a low degree of substitution shows such a considerable strength.

It is obvious that these film-forming properties have considerable value for sizing compositions.

Example XIV

In the same manner as indicated in Example XIII the product prepared according to Example II was investigated.

A film strength of 613 kg./cm.$^2$ was obtained.

Example XV

A cotton warp yarn (count 30) was sized on commercial equipment in a textile mill with an aqueous solution of 3.2% by weight of the product prepared according to Example V.

In spite of the low concentration of the combined ether in the sizing solution, the weaving characteristics of the sized yarns attained the level normally obtained with starch sizing compositions.

The advantages of the use of the mixture of the invention will be obvious, because the preparation of the sizing solution requires no heating, the desizing is easy and can take place without the use of enzymes.

Moreover the use of the mixture of the invention is economical, because the mixture is prepared largely from the cheap chemical starch.

Worsted yarns were also sized on a commercial scale with the product already mentioned in this example. The weavability was also satisfactory in this case.

An ether mixture prepared according to Example X was tested as a fluid loss reducing agent in drilling muds. The results were found to be very satisfactory also with regard to the rheological properties of the muds.

I claim:

1. A sizing composition consisting essentially of a solution in water of a mixture of carboxymethyl cellulose and from 0.1 to 20 parts by weight, based on the carboxymethyl cellulose, of carboxymethyl starch prepared by mixing alkali cellulose with an amount of an etherifying reagent selected from the group consisting of chloracetic acid and sodium chloracetate, said amount being at least substantially equivalent to the alkali of said alkali cellulose, reacting said etherifying reagent with said alkali cellulose until said alkali is substantially consumed, whereby a reaction mixture containing a cellulose ether is formed, providing an unreacted amount of said etherifying reagent in said reaction mixture, adding starch to said reaction mixture, and reacting said starch with the unreacted etherifying reagent in said mixture to form a starch ether.

2. A process for the manufacture of a mixture of a cellulose ether with a starch ether, said starch ether in said mixture being from 0.1 to 20 parts by weight based on the cellulose ether, comprising the steps of mixing alkali cellulose with an amount of an etherifying reagent selected from the group consisting of chloracetic acid and sodium chloracetate, said amount being at least substantially equivalent to the alkali of said alkali cellulose, reacting said etherifying reagent with said alkali cellulose until said alkali is substantially consumed, whereby a reaction mixture containing a cellulose ether is formed, providing an unreacted amount of said etherifying reagent in said reaction mixture, adding starch to said reaction mixture, and reacting said starch with the unreacted etherifying reagent in said mixture to form a starch ether.

3. A process according to claim 2, wherein said unreacted amount of said etherifying agent is provided by adding a further amount of said etherifying agent to said reaction mixture.

4. A process according to claim 2, further comprising the step of extracting the reaction mixture obtained after the formation of said starch ether with an acidified mixture of water and an organic solvent miscible with water.

References Cited in the file of this patent

UNITED STATES PATENTS

| | | |
|---|---|---|
| 1,863,208 | Schorger | June 14, 1932 |
| 2,184,564 | Oxley et al. | Dec. 26, 1939 |
| 2,405,973 | Nichols et al. | Aug. 20, 1946 |
| 2,420,949 | Hager et al. | May 20, 1947 |
| 2,567,722 | Marberg et al. | Sept. 11, 1951 |
| 2,599,620 | Filbert | June 10, 1952 |
| 2,811,462 | Cramer et al. | Oct. 29, 1957 |

FOREIGN PATENTS

| | | |
|---|---|---|
| 701,868 | France | Mar. 24, 1931 |
| 520,540 | Belgium | June 24, 1955 |

OTHER REFERENCES

Gloor et al.: Hydroxyethylcellulose and Its Uses, Ind. and Eng. Chem., vol. 42, October 1950, pages 2150–2153.